US008609265B2

(12) United States Patent
Hong et al.

(10) Patent No.: US 8,609,265 B2
(45) Date of Patent: Dec. 17, 2013

(54) BATTERY PACK AND METHOD FOR FABRICATING THE SAME

(75) Inventors: Jintae Hong, Suwon-si (KR); Jaeuk Ryu, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 395 days.

(21) Appl. No.: 12/926,759

(22) Filed: Dec. 8, 2010

(65) Prior Publication Data

US 2011/0151285 A1 Jun. 23, 2011

(30) Foreign Application Priority Data

Dec. 18, 2009 (KR) .................. 10-2009-0126671

(51) Int. Cl.
*H01M 2/00* (2006.01)
*H01M 2/06* (2006.01)
*H01M 2/20* (2006.01)

(52) U.S. Cl.
USPC .............. 429/7; 429/159; 429/178; 429/149; 429/209; 174/257

(58) Field of Classification Search
USPC .............. 429/7, 122, 96–100, 208, 163–187; 221/282; 206/703; 320/107, 128, 130, 320/131; 29/745–746; 340/636.1–636.21
See application file for complete search history.

(56) References Cited

U.S. PATENT DOCUMENTS

| | | | |
|---|---|---|---|
| 2008/0254350 A1 | 10/2008 | Moon | |
| 2009/0117458 A1* | 5/2009 | Yun | 429/178 |
| 2009/0154048 A1* | 6/2009 | Jang et al. | 361/106 |
| 2009/0246615 A1* | 10/2009 | Park | 429/149 |
| 2010/0266891 A1* | 10/2010 | Kwon et al. | 429/159 |

FOREIGN PATENT DOCUMENTS

| | | | | |
|---|---|---|---|---|
| KR | 10-0719724 B1 | 5/2007 | | |
| KR | 10 2008-0092176 A | 10/2008 | | |
| NL | 1804561 | * 4/2007 | | H05K 3/36 |

* cited by examiner

*Primary Examiner* — Basia Ridley
*Assistant Examiner* — Caitlin Wilmot
(74) *Attorney, Agent, or Firm* — Lee & Morse, P.C.

(57) ABSTRACT

A battery pack and a method for fabricating the same are provided. The battery pack includes a plurality of battery cells connected in series or in parallel to each other, a protective circuit module (PCM) controlling charging and discharging of the plurality of battery cells, and a coverlay electrically connecting the plurality of battery cells to the PCM, wherein the coverlay includes a plurality of wires, each of the plurality of wires includes battery connecting pads provided at its one end, the battery connecting pads connected to the battery cells, and module connecting pads provided at it's the other end, the module connecting pads connected to the PCM, and a solder layer is formed on the battery connecting pads.

20 Claims, 12 Drawing Sheets

BATTERY PACK AND METHOD FOR FABRICATING THE SAME

BACKGROUND

1. Field

Embodiments relate to a battery pack and a method for fabricating the same.

2. Description of the Related Art

In recent years, as electronics, communications, and computers are rapidly developed, portable electronic devices are being widely used. In addition, rechargeable secondary batteries are typically being used as power sources of such portable electronic devices.

A secondary battery including a unitary battery cell may satisfactorily serve as a power source of small-sized electronic device, e.g., a mobile phone. However, in a medium- or large-sized electronic device, e.g., a notebook computer, an electric tool, or an electric bicycle, in order to offer sufficient output or capacity, a battery pack having a plurality of battery cells connected in series or in parallel to each other may be used.

SUMMARY

Embodiments are directed to a battery pack and a method for fabricating the same, which represent advances over the related art.

At least one of the above and other features and advantages may be realized by providing a battery pack including a plurality of battery cells connected in series or in parallel; a protective circuit module (PCM) for controlling charging and discharging of the plurality of battery cells; and a coverlay electrically connecting the plurality of battery cells to the PCM, wherein the coverlay includes a plurality of wires, each of the plurality of wires including module connecting pads provided at an end thereof, the module connecting pads being connected to the PCM, battery connecting pads provided at another end thereof, the battery connecting pads being connected to the battery cells and including a solder layer thereon.

The coverlay may be a flexible printed circuit board (FPCB) including the wires.

The coverlay may include an adhesive layer on a surface thereof, the adhesive layer being for adhering the coverlay to the plurality of battery cells.

The coverlay may surround the plurality of wires to insulate the wires, and may include an insulating layer having a module connecting pad opening and a battery connecting pad opening, the module connecting pads being exposed through the module connecting pad opening and the battery connecting pads being exposed through the battery connecting pad opening.

The battery pack may further include electrode tabs electrically connecting the battery connecting pads and respective positive and negative electrode terminals of the battery cells, wherein the coverlay includes at least one through-hole at a position corresponding to at least one of the electrode tabs through which the at least one electrode tab passes.

Each of the electrode tabs may include a battery contact portion connected to the positive electrode terminal or the negative electrode terminal of the battery cells, a pad contact portion connected to each of the battery connecting pads, and a bent portion between the battery contact portion and the pad contact portion, the bent portion being configured to facilitate bending of the battery contact portion and the pad contact portion at a predetermined position.

Each of the electrode tabs may include a solder receiving hole, the solder receiving hole accommodating solder from the solder layer when the pad contact portion and the battery connecting pad are welded to each other.

An internal space and an entrance of the solder receiving hole may be covered by the solder.

The bent portion may include an area at which a width of the battery contact portion is different from a width of the pad contact portion.

The bent portion may include at least one notch on at least one lateral side or on at least one surface of the electrode tab.

The bent portion may include at least two notches on opposite lateral sides or opposite lateral surfaces of the electrode tab.

The plurality of battery cells may include a total number of battery cells and a number of the wires may be one greater than the total number of the battery cells.

At least one of the above and other features and advantages may also be realized by providing a method for manufacturing a battery pack including connecting a plurality of battery cells in series or in parallel using a plurality of electrode tabs; preparing a coverlay including a plurality of wires and through-holes; electrically connecting a protective circuit module (PCM) to the plurality of wires; mounting the coverlay on a surface of the plurality of battery cells such that at least one of the electrode tabs passes through the through-holes in the coverlay; bending the electrode tabs such that the electrode tabs contact a plurality of battery connecting pads at ends of the plurality of wires; and welding the electrode tabs to the respective battery connecting pads.

The electrode tabs may include solder receiving holes, wherein each of the battery connecting pads includes a solder layer, and wherein, during welding of the electrode tabs to the battery connecting pads, solder of the solder layer is melted such that the solder flows into the solder receiving holes.

Welding of the electrode tabs to the battery connecting pads may include sequentially welding from a negative electrode terminal to a positive electrode terminal of the battery pack including the plurality of battery cells connected in series to each other.

Sequentially welding from the negative electrode terminal to the positive electrode terminal of the battery pack may include welding the electrode tab connected to a negative electrode terminal of a first battery cell to a corresponding battery connecting pad, sequentially welding the electrode tabs connected to negative electrode terminals of a second battery cell and battery cells following the second battery cell to corresponding battery connecting pads, and welding the electrode tab connected to a positive electrode terminal of a final battery cell to a corresponding battery connecting pad.

BRIEF DESCRIPTION OF THE DRAWINGS

The above and other features and advantages will become more apparent to those of ordinary skill in the art by describing in detail exemplary embodiments with reference to the attached drawings, in which:

FIGS. 8 through 12B illustrate stages in a method for manufacturing a battery pack according to an embodiment.

DETAILED DESCRIPTION

Korean Patent Application No. 10-2009-0126671, filed on Dec. 18, 2009, in the Korean Intellectual Property Office, and entitled: "Battery Pack and Method for Fabricating the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
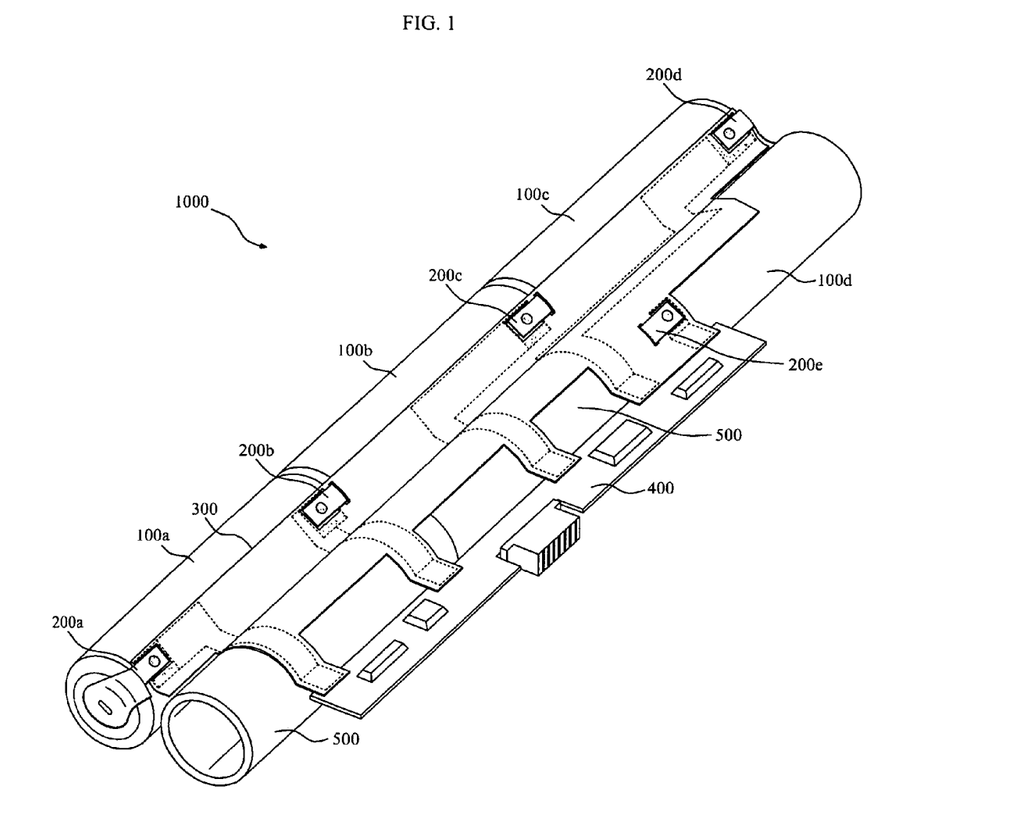
FIG. 1 illustrates a perspective view of a battery pack according to an embodiment.
Figure 2:
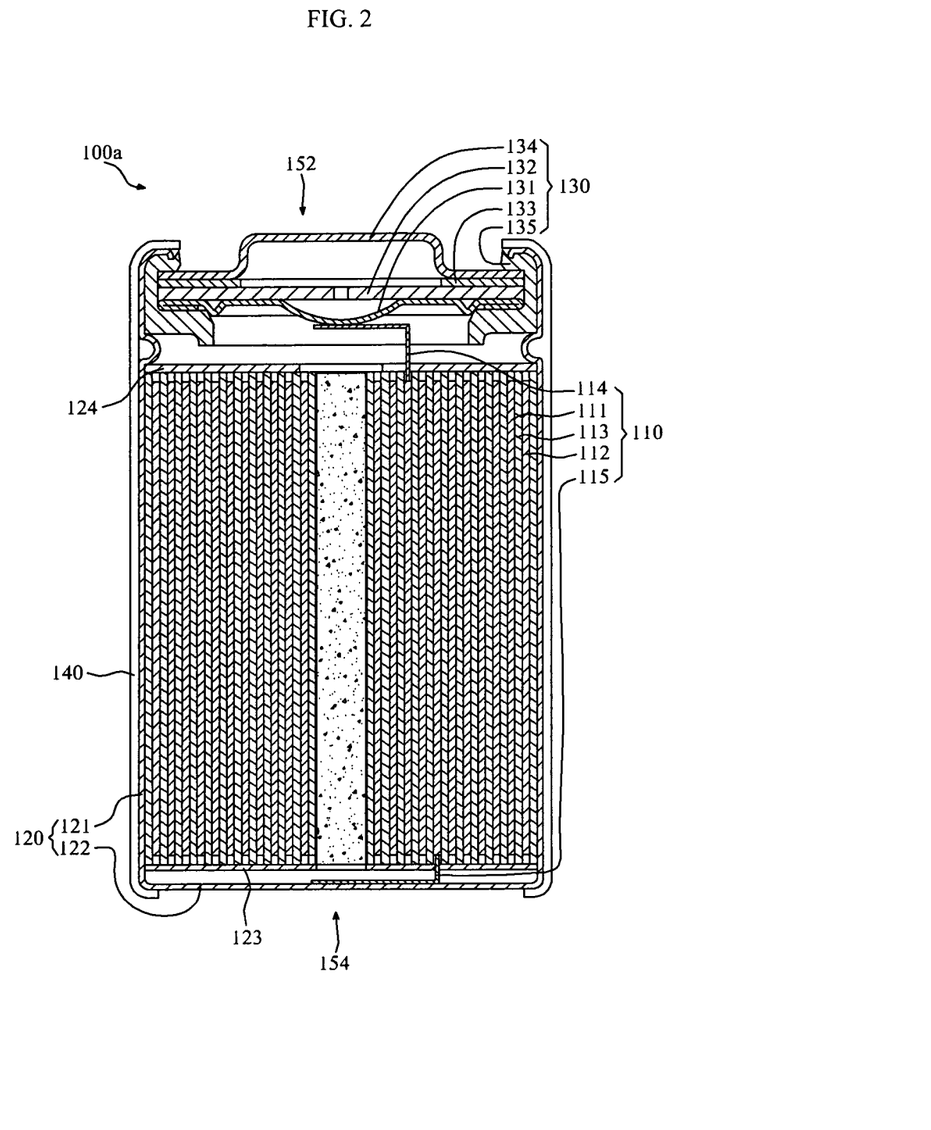
FIG. 2 illustrates a cross-sectional view of a battery cell of the battery pack illustrated in FIG. 1.
Figure 3:
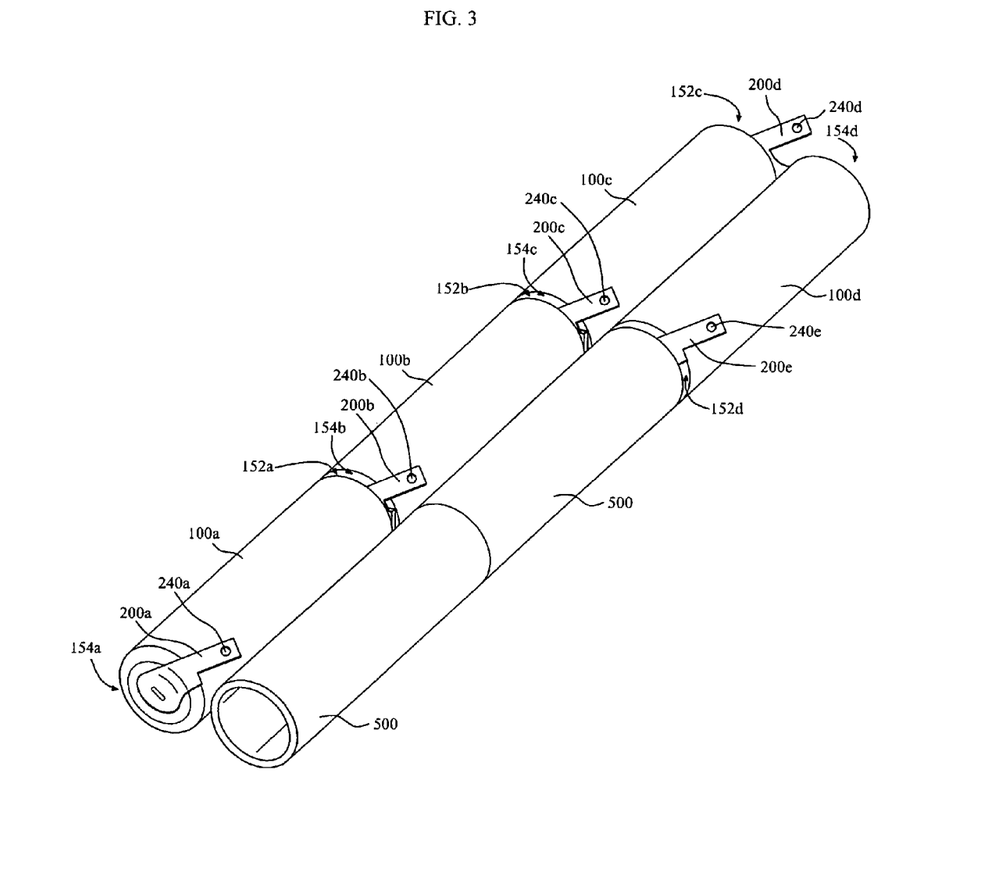
FIG. 3 illustrates a perspective view of battery cells and electrode tabs of the battery pack illustrated in FIG. 1.
Figure 6:
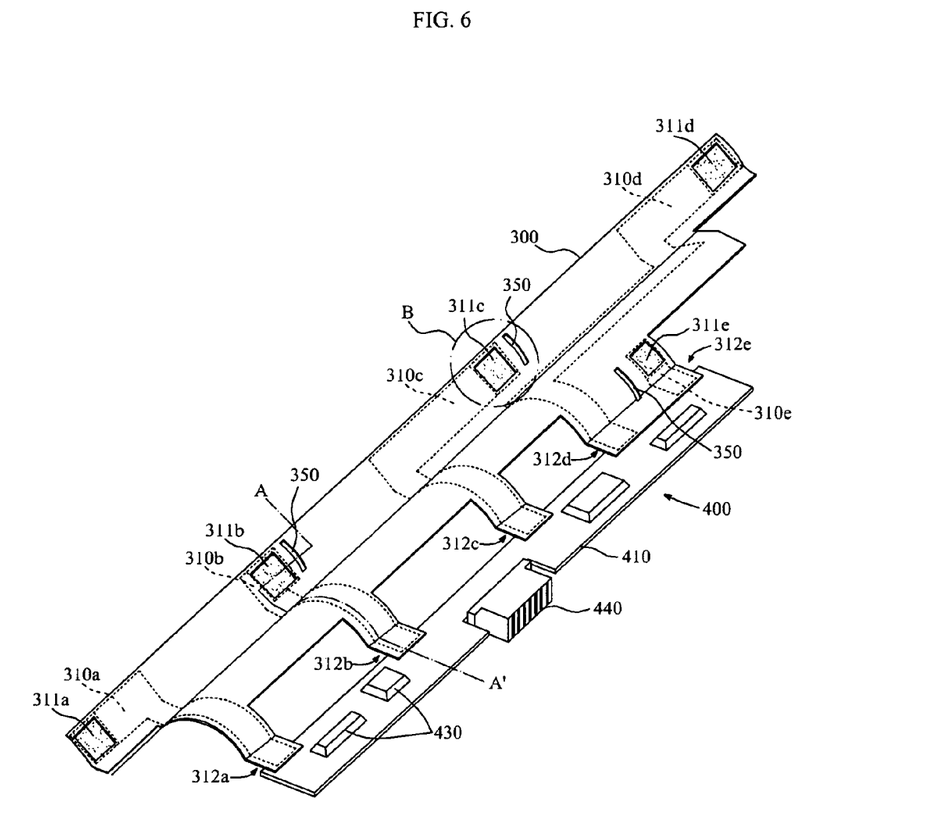
FIG. 6 illustrates a perspective view of a coverlay and a protective circuit module (PCM) of the battery pack illustrated in FIG. 1.
Figure 7A:
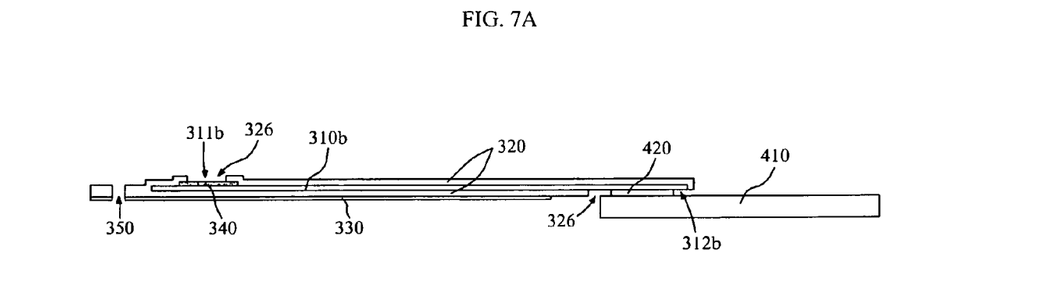
FIG. 7A illustrates a cross-sectional view taken along the line A-A' of FIG. 6.
Figure 7B:
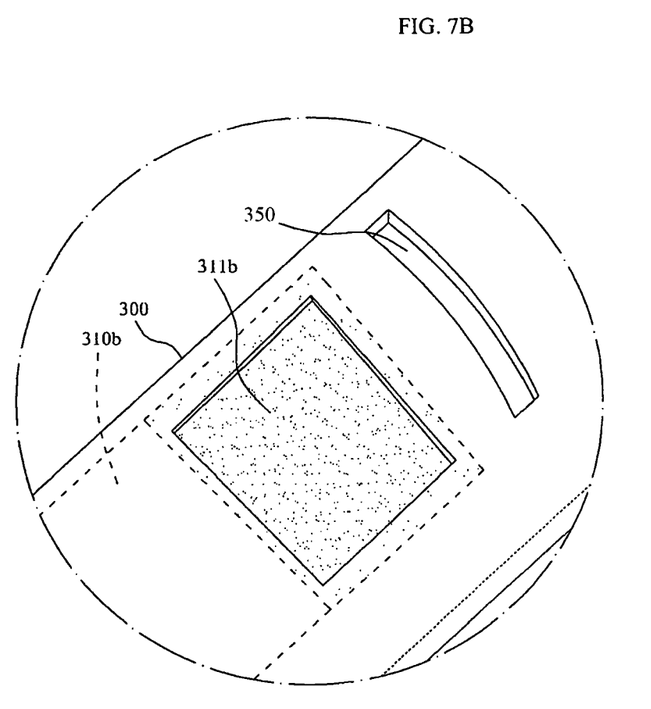
FIG. 7B illustrates an enlarged view of a region "B" illustrated in FIG. 6.

Hereinafter, embodiments will be described in detail with reference to the accompanying drawings. FIG. 1 illustrates a perspective view of a battery pack according to an embodiment. FIG. 2 illustrates a cross-sectional view of a battery cell of the battery pack illustrated in FIG. 1. FIG. 3 illustrates a perspective view of battery cells and electrode tabs of the battery pack illustrated in FIG. 1. FIGS. 4A-4C and FIGS. 5A-5C illustrate various types of electrode tabs according to an embodiment. FIG. 6 illustrates a perspective view of a coverlay and a protective circuit module (PCM) of the battery pack illustrated in FIG. 1. FIG. 7A illustrates a cross-sectional view taken along the line A-N of FIG. 6. FIG. 7B illustrates an enlarged view of a region "B" illustrated in FIG. 6.

Referring to FIG. 1, the battery pack 1000 according to the present embodiment may include battery cells 100a, 100b, 100c, and 100d, electrode tabs 200a, 200b, 200c, 200d, and 200e, a coverlay 300, and a protective circuit module (PCM) 400.

In an implementation, the battery pack 1000 may also include a dummy cell 500.

In an implementation, the battery pack 1000 may include a plurality of battery cells 100a, 100b, 100c, and 100d connected in series to each other. In an alternative implementation, the battery pack 1000 may include the plurality of battery cells 100a, 100b, 100c, and 100d connected in parallel to each other.

In the battery pack 1000, the battery cells 100a, 100b, 100c, and 100d may be electrically connected to the PCM 400 using the coverlay 300.

The PCM 400 may control charging and discharging of the battery pack 1000.

Although the present embodiment discloses a structure of the battery pack 1000 in which four battery cells 100a, 100b, 100c, and 100d are connected in series to each other, the embodiments are not limited thereto. In other words, for brevity of explanation, the battery pack 1000 having four battery cells denoted by reference numerals 100a, 100b, 100c, and 100d connected in series to each other is illustrated, but the embodiments may also be applied to a battery pack having two or more battery cells connected in series or in parallel to each other.

As described above, the battery pack 1000 illustrated in FIG. 1 may include four battery cells 100a, 100b, 100c, and 100d connected in series to each other. Although six battery cells connected in parallel to each other are illustrated in FIG. 1, four battery cells 100a, 100b, 100c, and 100d and two dummy cells 500 are actually included in the battery pack 1000.

In the structure illustrated in FIG. 1, the four battery cells 100a, 100b, 100c, and 100d and two dummy cells 500 are arranged in two rows. The four battery cells 100a, 100b, 100c, and 100d may be connected in series to each other using the electrode tabs 200a, 200b, 200c, 200d, and 200e.

In the battery pack 1000 according to the present embodiment, an arrangement of the battery cells 100a, 100b, 100c, and 100d and the two dummy cells 500, as illustrated in FIG. 1, may be used in an electronic device, e.g., a notebook computer. Thus, the arrangement may vary according to a capacity and a size of the battery pack 1000 desired. Accordingly, it is noted that aspects of the embodiments are not limited to the battery pack 1000 having four battery cells 100a, 100b, 100c, and 100d and two dummy cells 500, as illustrated in FIG. 1.

Referring to FIG. 2, the battery pack 1000 according to an embodiment may include four battery cells 100a, 100b, 100c, and 100d. The battery cells 100a, 100b, 100c, and 100d may all have the same configuration; and the following description will be made with regard to the battery cell 100a by way of example. The battery cell 100a may include an electrode assembly 110, a can 120, a cap assembly 130, and a label 140.

The electrode assembly 110 may include a first electrode plate 111, a second electrode plate 112, and a separator 113 interposed between the first electrode plate 111 and the second electrode plate 112. The first electrode plate 111, the second electrode plate 112, and the separator 113 may be wound.

In addition, the electrode assembly 110 may include a first electrode lead 114 electrically connected to the first electrode plate 111 and a second electrode lead 115 electrically connected to the second electrode plate 112. The first electrode lead 114 may be electrically connected to the cap assembly 130 and the second electrode lead 115 may be electrically connected to the can 120.

The first electrode plate 111 may be a positive plate and the second electrode plate 112 may be a negative plate, or vice versa. In the present embodiment, for convenience of explanation, it is assumed that the first electrode plate 111 is a positive plate and the second electrode plate 112 is a negative plate. Therefore, the cap assembly 130 electrically connected to the first electrode plate 111 may become a positive electrode terminal 152 and the can 120, specifically a bottom surface 122 of the can 120, may become a negative electrode terminal 154.

The electrode assembly 110 may be accommodated in the can 120.

The can 120 may be formed of a substantially cylindrical case having a top end opened and made of a metallic material. The can 120 may have a cylindrical surface 121 having a predetermined diameter and a bottom surface 122 to give a space for accommodating the electrode assembly 110.

The accommodation space of the can 120 may include a lower insulating plate 123 and an upper insulating plate 124 as well as the electrode assembly 110. The lower insulating plate 123 and the upper insulating plate 124 may be provided at lower and upper portions of the electrode assembly 110, respectively, to prevent the first electrode plate 111 and the second electrode plate 112 of the electrode assembly 110 from contacting the can 120 when the electrode assembly 110 is accommodated in the can 120, thereby preventing an electrical short.

The cap assembly 130 may seal an opening of the can 120.

The cap assembly 130 may include a safety vent 131 configured to invert when an internal pressure of the battery cell 100a increases above a predetermined level. The cap assembly 130 may also include a current breaker 132 above the safety vent 131 and electrically and mechanically connected thereto to be disconnected when the safety vent 131 is inverted. The cap assembly 130 may also include a positive temperature coefficient (PTC) element 133 above the current breaker 132 and electrically and mechanically connected thereto to then abruptly increase resistance when an internal temperature of the battery cell 100a increases above a predetermined level. The cap assembly 130 may also include a cap-up 134 above the PTC element 133 and electrically and mechanically connected thereto. The cap assembly 130 may also include a gasket 135 insulating the safety vent 131, the current breaker 132, the PTC element 133, and the cap-up 134 from the can 120 while surrounding side perimeters of the safety vent 131, the current breaker 132, the PTC element 133, and the cap-up 134.

The label 140 may cover at least the cylindrical surface 121 of the can 120 to protect the cylindrical surface 121 of the battery cell 110.

The cap assembly 130, specifically the cap-up 134, may serve as the positive electrode terminal 152 and the bottom surface 122 of the can 120 may serve as the negative electrode terminal 154, to then protrude outside.

The label 140 may be made of, e.g., a thermally shrinkable film.

Referring to FIG. 3, the battery pack 1000 may include a plurality of battery cells 100a, 100b, 100c, and 100d connected in series to each other. In consideration of a capacity and a size of the battery pack 1000, the battery cells 100a, 100b, 100c, and 100d may be arranged in two or more rows. In an implementation, the battery cells 100a, 100b, 100c, and 100d may be connected in series to each other by electrode tabs 200a, 200b, 200c, 200d, and 200e. For convenience of explanation, in designating each of the respective battery cells 100a, 100b, 100c, and 100d of the battery pack 1000, a battery cell denoted by reference numeral 100a is referred to as a first battery cell, a battery cell denoted by reference numeral 100b is referred to as a second battery cell, a battery cell denoted by reference numeral 100c is referred to as a third battery cell, and a battery cell denoted by reference numeral 100d is referred to as a fourth battery cell, respectively. In addition, in designating each of the respective electrode tabs 200a, 200b, 200c, 200d, and 200e, an electrode tab denoted by reference numeral 200a is referred to as a first electrode tab, an electrode tab denoted by reference numeral 200b is referred to as a second electrode tab, an electrode tab denoted by reference numeral 200c is referred to as a third electrode tab, an electrode tab denoted by reference numeral 200d is referred to as a fourth electrode tab, and an electrode tab denoted by reference numeral 200e is referred to as a fifth electrode tab, respectively.

In the battery pack 1000, the battery cells 100a, 100b, 100c, and 100d may be arranged such that a positive electrode terminal 152a of the first battery cell 100a is in contact with a negative electrode terminal 154b of the second battery cell 100b, a positive electrode terminal 152b of the second battery cell 100b is in contact with a negative electrode terminal 154c of the third battery cell 100c, and a positive electrode terminal 152c of the third battery cell 100c is in contact with a negative electrode terminal 154d of the fourth battery cell 100d.

Among the electrode tabs 200a, 200b, 200c, 200d, and 200e, the first electrode tab 200a may be connected to a negative electrode terminal 154a of the first battery cell 100a. The second electrode tab 200b may be simultaneously connected to the positive electrode terminal 152a of the first battery cell 100a and the negative electrode terminal 154b of the second battery cell 100b. The third electrode tab 200c may be simultaneously connected to the positive electrode terminal 152b of the second battery cell 100b and the negative electrode terminal 154c of the third battery cell 100c. The fourth electrode tab 200d may be simultaneously connected to the positive electrode terminal 152b of the second battery cell 100b and the negative electrode terminal 154d of the fourth battery cell 100d. The fifth electrode tab 200e may be connected to the positive electrode terminal of the fourth battery cell 100d.

Accordingly, among the electrode tabs 200a, 200b, 200c, 200d, and 200e, the first electrode tab 200a may become a negative electrode of the battery pack 1000 and the fifth electrode tab 200e may become a positive electrode of the battery pack 1000, which will now be described with reference to FIGS. 4A through 4C.

The electrode tabs 200a, 200b, 200c, 200d, and 200e may be provided in the battery pack in, e.g., three types.

Figure 4A:
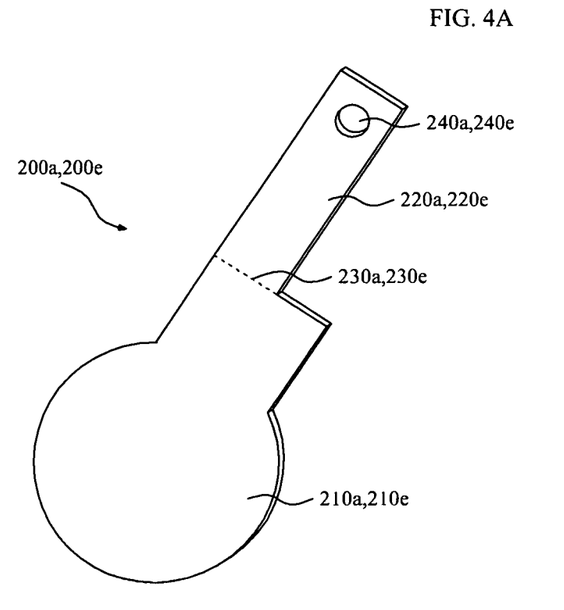
FIGS. 4A-4C and FIGS. 5A-5C illustrate various types of electrode tabs according to an embodiment.

In detail, as illustrated in FIG. 4A, a first-type electrode tab, e.g., the first electrode tab 200a or the fifth electrode tab 200e, may contact only a single electrode terminal, either the positive electrode terminal 152d or the negative electrode terminal 154a. As illustrated in FIG. 4B, a second-type electrode tab, e.g., the second electrode tab 200b or the third electrode tab 200c, may simultaneously contact a positive electrode terminal and a negative electrode terminal. As illustrated in FIG. 4C, a third-type electrode tab, e.g., the fourth electrode tab 200d, may simultaneously contact a positive electrode terminal and a negative electrode terminal, wherein the respective electrode terminals correspond to battery cells arranged in different rows, i.e., the third battery cell 100c and the fourth battery cell 100d.

The first-type electrode tab, e.g., the first electrode tab 200a and the fifth electrode tab 200e, will now be described with reference to FIG. 4A. Each of the first electrode tab 200a and the fifth electrode tab 200e may include a contact portion 210a, 210e, a pad contact portion 220a, 220e, a bent portion 230a, 230e, and a solder receiving hole 240a, 240e.

The battery contact portion 210a of the first electrode tab 200a may contact the negative electrode terminal 154a of the first battery cell 100a and the battery contact portion 210e of the fifth electrode tab 200e may contact the positive electrode terminal 152d of the fourth battery cell 100d. Contact may be established by welding, e.g., resistance welding.

Since the battery contact portion 210a of the first electrode tab 200a and the battery contact portion 210e of the fifth electrode tab 200e may contact only the negative electrode terminal 154a of the first battery cell 100a and the positive electrode terminal 152d of the fourth battery cell 100d, respectively, portions of the battery contact portion 210a, 210e may correspond to the negative electrode terminal 154a and the positive electrode terminal 152d. In the present embodiment, circular electrode tabs are illustrated, but aspects of the embodiments are not limited thereto.

The pad contact portion 220a, 220e may be brought into contact with, e.g., welded to, respective battery connecting pads 311a and 311e of the coverlay 300, which will be described below.

The pad contact portion 220a, 220e may include the solder receiving hole 240a, 240e at a predetermined area.

The bent portion 230a, 230e may be provided at a given position between the battery contact portion 210a, 210e and the pad contact portion 220a, 220e.

The bent portion 230a, 230e may be an area at which each of the first electrode tab 200a and the second electrode tab 200e is bent in an inverted L-shape. The bent portion 230a, 230e, as illustrated in FIG. 4A, may be provided at an area where a width of the battery contact portion 210a, 210e is different from a width of the pad contact portion 220a, 220e. In other words, when the width of the battery contact portion 210a, 210e is different from the width of the pad contact portion 220a, 220e, the bent portion 230a, 230e may be bent by applying a force to the pad contact portion 220a, 220e in a state in which the battery contact portion 210a, 210e is engaged with the corresponding battery cell by welding. Thus, each of the first electrode tab 200a and the second electrode tab 200e may be bent in the inverted L-shape, as illustrated in FIG. 1.

The second-type electrode tab, e.g., the second electrode tab 200b or the third electrode tab 200c, will now be described with reference to FIG. 4B. Each of the second electrode tab 200b and the third electrode tab 200c may include a contact portion 210b, 210c, a pad contact portion 220b, 220c, a bent portion 230b, 230c, and a solder receiving hole 240b, 240c.

The battery contact portion 210b of the second electrode tab 200b may contact the positive electrode terminal 152a of the first battery cell 100a and the negative electrode terminal 154b of the second battery cell 100b. The battery contact portion 210c of the third electrode tab 200c may contact the positive electrode terminal 152b of the second battery cell 100b and the negative electrode terminal 154c of the third battery cell 100c. Contact may be established by welding, e.g., resistance welding.

The battery contact portion 210b of the second electrode tab 200b and the battery contact portion 210c of the third electrode tab 200c may be in contact with two opposite electrode terminals facing each other. Consequently, the battery contact portion 210b of the second electrode tab 200b and the battery contact portion 210c of the third electrode tab 200c may include first battery contact plates 212b and 212c, second battery contact plates 214b and 214c, and connecting plates 216b and 216c connecting the first battery contact plates 212b and 212c and the second battery contact plates 214b and 214c, respectively.

The first battery contact plates 212b and 212c may be parallel with each other; and the second battery contact plates 214b and 214c may be parallel with each other. The connecting plate 216b, 216c may connect the first battery contact plate 212b, 212c and the second battery contact plate 214b, 214c to each other and may support the same.

The pad contact portion 220b, 220c may extend from one of the battery contact portion 210b or the battery contact portion 210c. Specifically, the pad contact portion 220b, 220c may extend from one of the first battery contact plates 212b and 212c or one of the second battery contact plates 214b and 214c.

The pad contact portion 220b, 220c may be brought into contact with, e.g., welded to, respective battery connecting pads 311b and 311c of the coverlay 300, which will be described below.

The pad contact portion 220b, 220c may include the solder receiving hole 240b, 240c at a predetermined area. The bent portion 230b, 230c may be provided at a given position between the battery contact portion 210b, 210c and the pad contact portion 220b, 220c.

The bent portion 230b, 230c may be an area at which each of the second electrode tab 200b and the third electrode tab 200c is bent in an inverted L-shape. The bent portion 230b, 230c, as illustrated in FIG. 4B, may be provided at an area where a width of the battery contact portion 210b, 210c is different from a width of the pad contact portion 220b, 220c. In other words, when the width of the battery contact portion 210b, 210c is different from the width of the pad contact portion 220b, 220c, the bent portion 230b, 230c may be bent by applying a force to the pad contact portion 220b, 220c in a state in which the battery contact portion 210b, 210c is engaged with the corresponding battery cell by welding. Thus, each of the second electrode tab 200b and the third electrode tab 200c may be bent in an inverted L-shape, as illustrated in FIG. 1.

The third-type electrode tab, e.g., the fourth electrode tab 200d, will now be described with reference to FIG. 4C. The fourth electrode tab 200d may include a battery contact portion 210d, a pad contact portion 220d, a bent portion 230d, and a solder receiving hole 240d.

The battery contact portion 210d of the fourth electrode tab 200d may simultaneously contact the positive electrode terminal 152c of the third battery cell 100c and the negative electrode terminal 154d of the fourth battery cell 100d. Contact may be established by welding, e.g., resistance welding.

Since the battery contact portion 210d of the fourth electrode tab 200d may be in contact with two electrode terminals parallel to each other, it may have a different width from the battery contact portion 210a, 210e of the first and fifth electrode tab 200a, 200e illustrated in FIG. 4A. In other words, the illustrated fourth electrode tab 200d may be an unfolded version of the second or third electrode tab 200b, 200c in which a first battery contact plate 212b, 212c, a connecting plate 216b, 216c, and a second battery contact plate 214b, 214c, are not bent in the battery contact portion 210b, 210c.

The pad contact portion 220d may extend from the battery contact portion 210d.

The pad contact portion 220d may be brought into contact with, e.g., welded to, a battery connecting pad 311d of the coverlay 300, which will be described below.

The pad contact portion 220d may include the solder receiving hole 240d at a predetermined area.

The bent portion 230d may be provided at a given position between the battery contact portion 210d and the pad contact portion 220d.

The bent portion 230d may include an area at which the fourth electrode tab 200d is bent in an inverted L-shape. The bent portion 230d, as illustrated in FIG. 4C, may be provided at an area where a width of the battery contact portion 210d is different from a width of the pad contact portion 220d. In other words, when the width of the battery contact portion 210d is different from the width of the pad contact portion 220d, the bent portion 230d may be bent by applying a force to the pad contact portion 220d in a state in which the battery contact portion 210d is engaged with the corresponding battery cell by welding. Thus, the fourth electrode tab 200d may be bent in the inverted L-shape, as illustrated in FIG. 1.

Figure 4B:
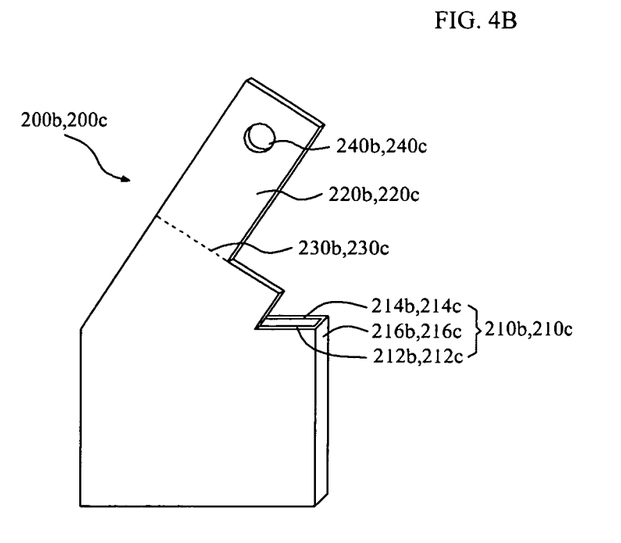
Figure 4C:
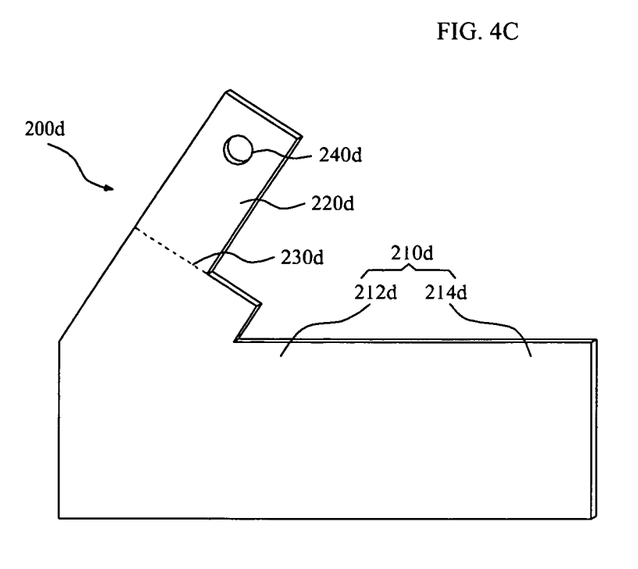
Figure 5A:
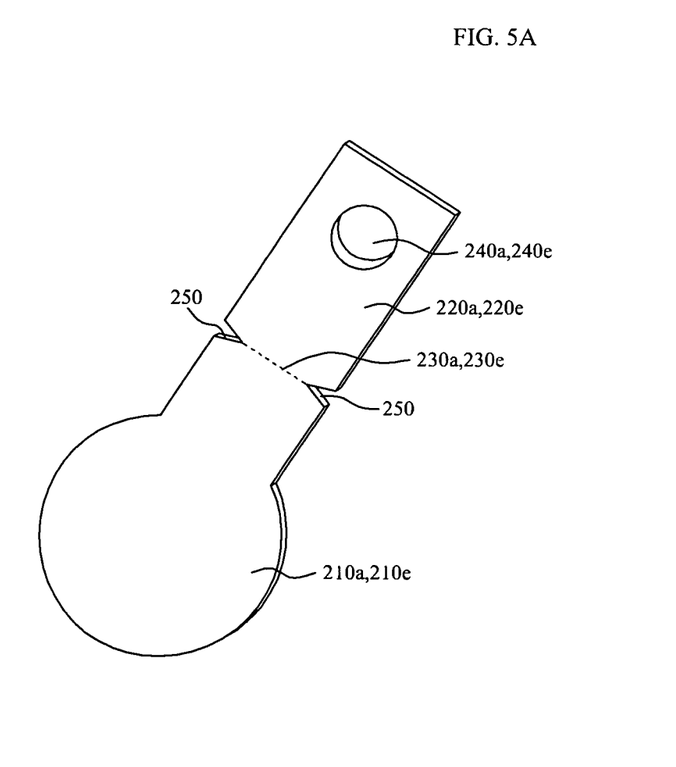
Figure 5B:
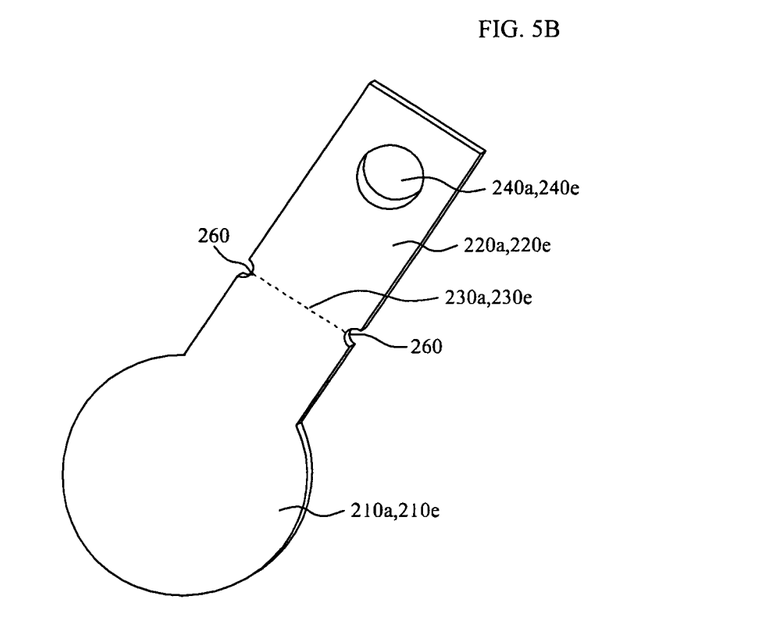
Figure 5C:
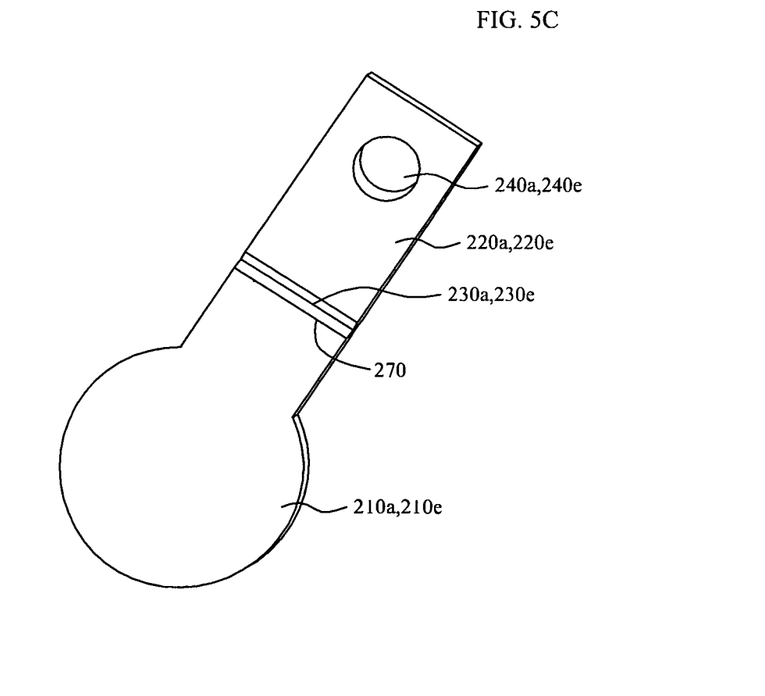

Referring to FIGS. 5A through 5C, the bent portions 230a, 230b, 230c, 230d, and 230e of the electrode tabs 200a, 200b, 200c, 200d, and 200e illustrated in FIGS. 4A through 4C may be formed by making widths of the battery contact portions 210a, 210b, 210c, 210d, and 210e different from widths of the pad contact portions 220a, 220b, 220c, 220d, and 220e. However, the bent portions 230a, 230b, 230c, 230d, and 230e may take on various forms, as illustrated in FIGS. 5A through 5C. While FIGS. 5A through 5C illustrate a first-type electrode tab, e.g., the first electrode tab 200a and the fifth electrode tab 200e, as illustrated in FIG. 4A, by way of example, the embodiments may also be applied to a second-type electrode tab and a third-type electrode tab, e.g., the second electrode tab 200b or the third electrode tab 200c, and the fourth electrode tab 200d, as illustrated in FIGS. 4B and 4C, respectively.

The bent portions 230a and 230e may be formed by forming notches 250, 260, and 270 between each of the battery contact portions 210a and 210e and each of the pad contact portions 220a and 220e.

In other words, as illustrated in FIGS. 5A and 5B, the electrode tabs 200a and 200e may respectively have a first notch 250 or a second notch 260 on opposite sides thereof. The first notch 250 may have a triangular shape and the second notch 260 may have a semicircular shape, so as to have a reduced width threat compared to other areas. In an alternative implementation, as illustrated in FIG. 5C, the electrode tab 200a, 200e may have a third notch 270 formed on opposite surfaces thereof, to make thicknesses of bent portion 230a and 230e thinner than other portions of the electrode tab.

Since the notches 250, 260, and 270 may be formed on the electrode tabs 200 and, 200e, the bent portion 230a, 230e may be relatively easily bent compared to other areas when a force is applied to the pad contact portion 220a, 220e of the electrode tab 200a, 200e. In other words, bending may occur around the bent portion 230a, 230e, thereby allowing the electrode tabs 200a and 200e to be easily bent in the inverted L-shape.

Referring to FIGS. 6, 7A and 7B, the coverlay 300 may be a flexible printed circuit board (FPCB). The coverlay 300 may include a plurality of wires 310a, 310b, 310c, 310d, and 310e, an insulating layer 320 that insulates the wires 310a, 310b, 310c, 310d, and 310e from one another, and an adhesive layer 330 for adhering the coverlay 300 to, e.g., the battery cells 100.

The wires 310a, 310b, 310c, 310d, and 310e may be provided such that positive and negative electrode terminals of each of the battery cells 100a, 100b, 100c, and 100d may all be connected to the PCM 400 to allow each of the battery cells 100a, 100b, 100c, and 100d to be controlled by the PCM 400. Therefore, the number of the wires 310a, 310b, 310c, 310d, and 310e may be one greater than the total number of active battery cells 100a, 100b, 100c, and 100d.

The wires 310a, 310b, 310c, 310d, and 310e may respectively include battery connecting pads 311a, 311b, 311c, 311d, and 311e at one end thereof and module connecting pads 312a, 312b, 312c, 312d, and 312e at another end thereof, as representatively illustrated in FIG. 7A. FIG. 7A illustrates a cross-sectional view of the wire 310b, taken along the line A-A' of FIG. 6. Each of the battery connecting pads 311a, 311b, 311c, 311d, and 311e and each of the module connecting pads 312a, 312b, 312c, 312d, and 312e may be exposed by openings 326 in the insulating layer 320, respectively.

Each of the battery connecting pads 311a, 311b, 311c, 311d, and 311e may be formed by providing a solder layer 340 on each of the wires 310a, 310b, 310c, 310d, and 310e, respectively.

The insulating layer 320 may insulate not only the wires 310a, 310b, 310c, 310d, and 310e from one another, but also the wires 310a, 310b, 310c, 310d, and 310e from the outside.

The coverlay 300 may include at least one through-hole 350 passing through the insulating layer 320.

The at least one through-hole 350 may correspond to at least one of the electrode tabs 200a, 200b, 200c, 200d, and 200e and at least one of the battery connecting pads 311a, 311b, 311c, 311d, and 311e, such that at least one of the electrode tabs 200a, 200b, 200c, 200d, and 200e may pass therethrough to easily come into contact with at least one of the battery connecting pads 311a, 311b, 311c, 311d, and 311e. For example, as illustrated in FIG. 7B, the through-hole 350 may be formed at a position corresponding to the electrode tab 200b, while being positioned close to the battery connecting pad 311b.

The at least one of the electrode tabs 200a, 200b, 200c, 200d, and 200e may pass through the at least one through-hole 350 to then be bent, thereby preventing undesirable movement of the coverlay 300. In other words, the at least one of the electrode tabs 200a, 200b, 200c, 200d, and 200e, having passed through the at least one through-hole 350, may fix the coverlay 300, thereby allowing the battery connecting pads 311a, 311b, 311c, 311d, and 311e on the coverlay 300 to be connected to the electrode tabs 200a, 200b, 200c, 200d, and 200e at correct positions. In addition, the fixing of the coverlay 300 using the at least one through-hole 350 may prevent the electrode tabs 200a, 200b, 200c, 200d, and 200e from moving relative to the battery connecting pads 311a, 311b, 311c, 311d, and 311e when connecting, e.g., welding, the electrode tabs 200a, 200b, 200c, 200d, and 200e to the battery connecting pads 311a, 311b, 311c, 311d, and 311e, respectively.

The adhesive layer 330 may allow the coverlay 300 to be adhered to a surface of each of the battery cells 100a, 100b, 100c, and 100d.

The adhesive layer 330 may be formed by, e.g., coating an adhesive agent on a surface of the coverlay 300 or attaching a double-sided tape on the surface of the coverlay 300.

The coverlay 300 may be connected to the PCM 400.

The PCM 400 may perform control operations of the battery pack 1000 according to an embodiment.

The PCM 400 may include a substrate 410, contact pads 420 on the substrate 410 and connected to the wires 310a, 310b, 310c, 310d, and 310e, control devices 430 on the substrate 410 and including, e.g., IC elements or the like, and an external connecting member 440 at one side of the substrate 410 and connecting the battery pack 1000 to an external device.

The PCM 400 may be connected to the respective battery cells 100a, 100b, 100c, 100d, 100e through the wires 310a, 310b, 310c, 310d, and 310e. Thus, the PCM 400 may perform charging or discharging operations on the battery cells 100a, 100b, 100c, 100d, 100e.

Figure 11:
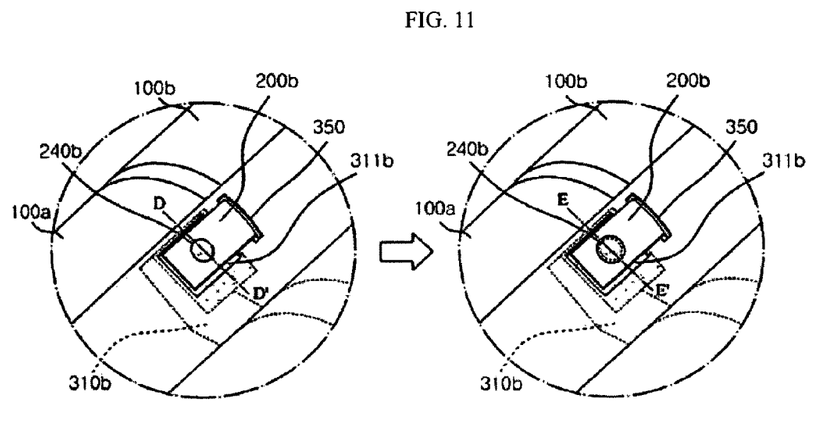
Figure 12A:
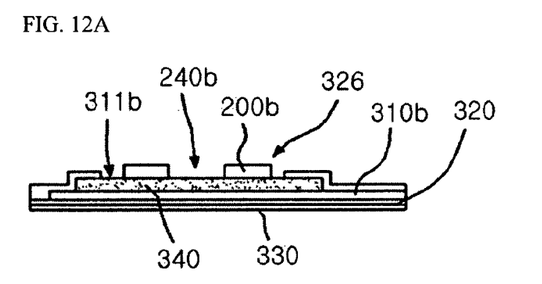
Figure 12B:
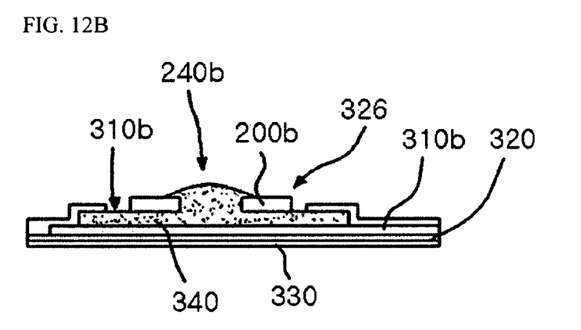

FIGS. 8 through 12B illustrate stages in a method for manufacturing a battery pack according to an embodiment. FIG. 11 illustrates an enlarged view of a region "C" of FIG. 10. FIG. 12A illustrates a cross-sectional view taken along the line D-D' of FIG. 11. FIG. 12B illustrates a cross-sectional view taken along the line E-E' of FIG. 11.

Referring to FIGS. 8 through 12B, a plurality of battery cells 100a, 100b, 100c, and 100d connected in series or in parallel to each other using a plurality of electrode tabs 200a, 200b, 200c, 200d, and 200e may be prepared. In the illustrated embodiment, four battery cells 100a, 100b, 100c, and 100d and two dummy cells 500 are arranged in two rows. The battery pack manufacturing method according to the present embodiment will be described with regard to a battery pack having the four battery cells 100a, 100b, 100c, and 100d connected in series to each other, but the embodiments are not limited thereto.

Figure 8:
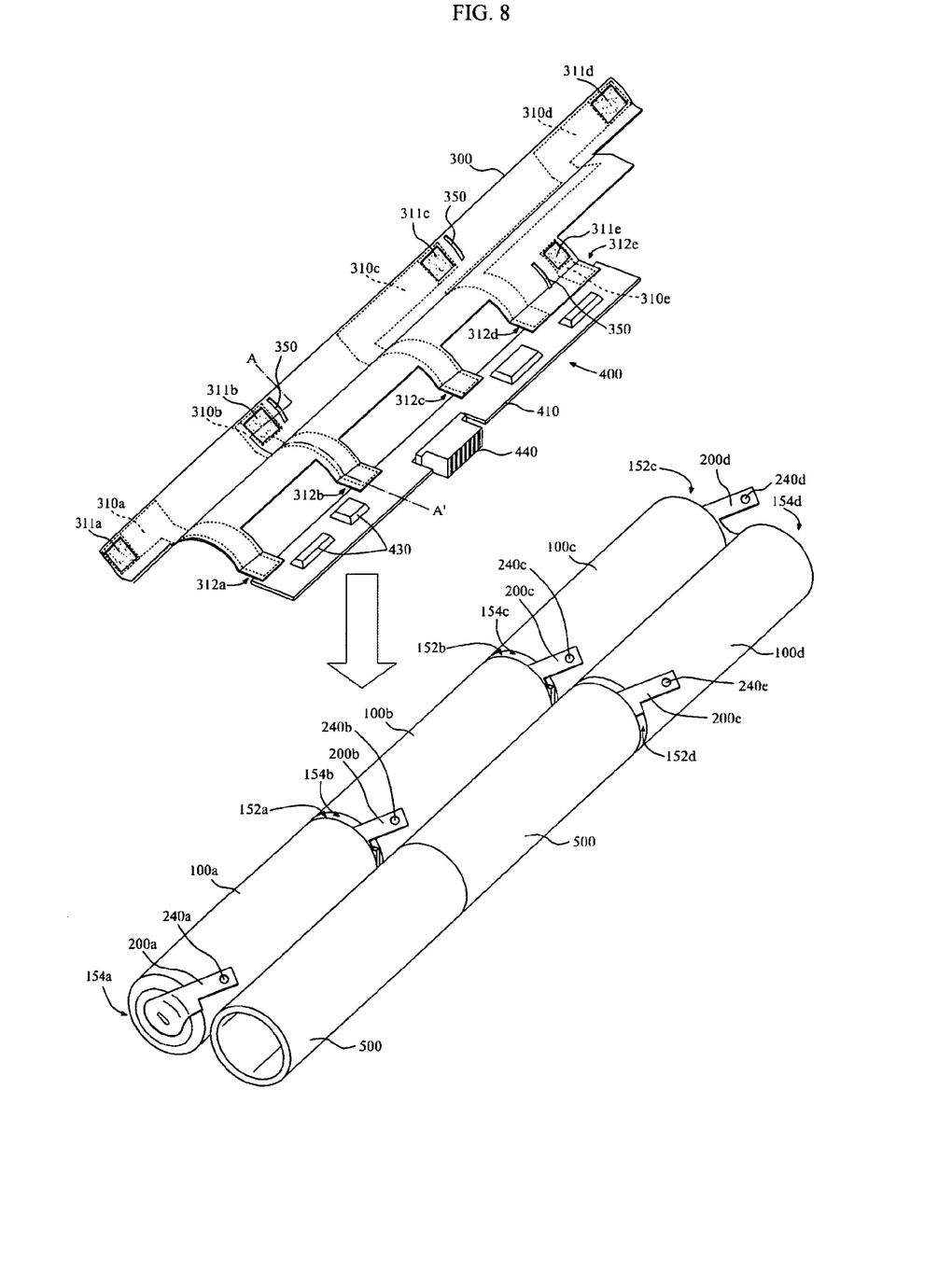
Figure 9:
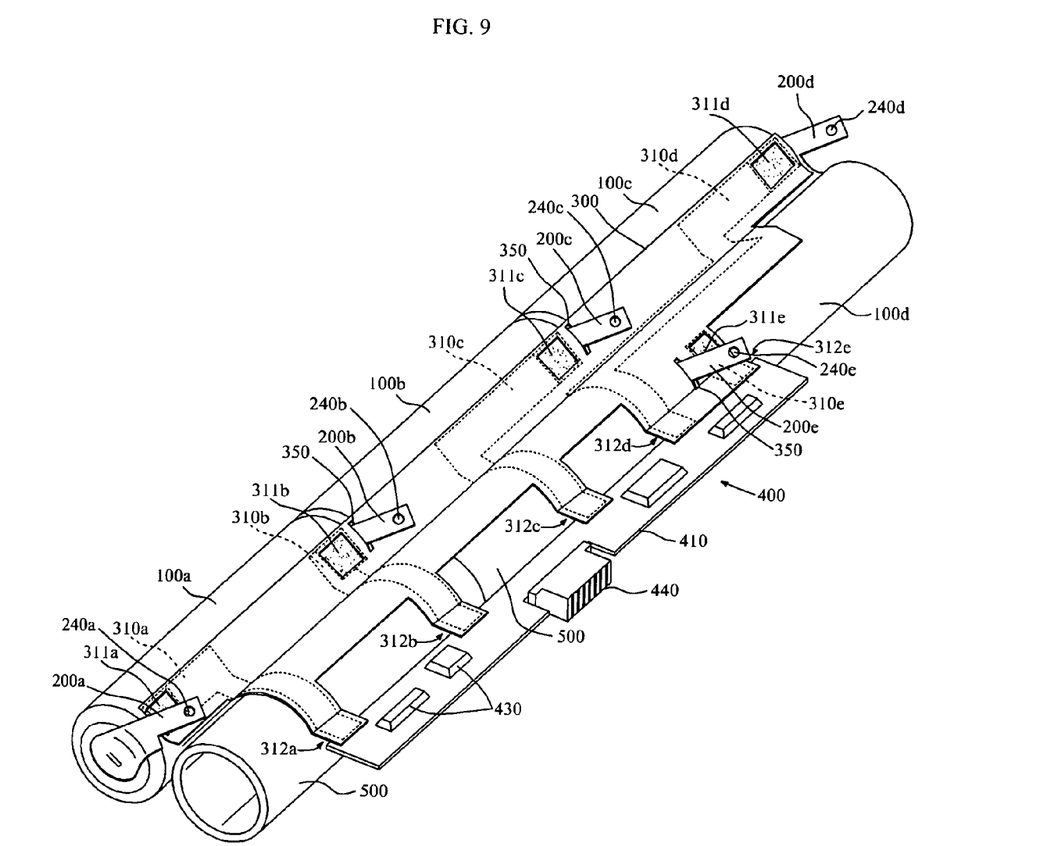
Figure 10:
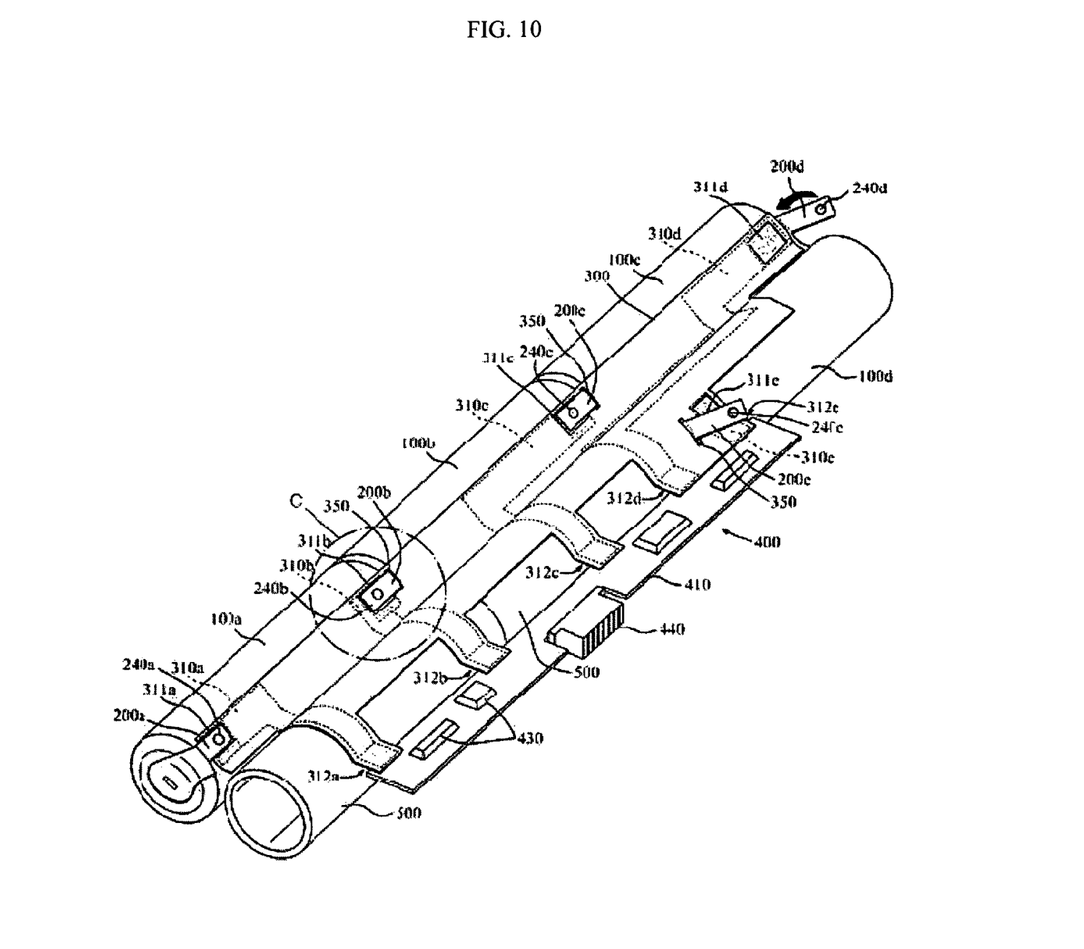

Next, the coverlay 300 and the PCM 400 coupled thereto may be prepared. The coverlay 300 may include a plurality of wires 310a, 310b, 310c, 310d, and 310e.

Next, the coverlay 300 may be seated on a surface of the battery cells 100a, 100b, 100c, and 100d and the dummy cells 500. At least one of the electrode tabs 200a, 200b, 200c, 200d, and 200e may pass through through-holes 350 in the coverlay 300.

The coverlay 300, as illustrated in FIG. 8, may include three through-holes 350 to allow three electrode tabs 200b, 200c, and 200d among the electrode tabs 200a, 200b, 200c, 200d, and 200e to pass therethrough. Accordingly, the three electrode tabs 200b, 200c, and 200d may pass through the three through-holes 350 to then be bent, thereby allowing the three electrode tabs 200b, 200c, and 200d to fix the coverlay 300.

Since the coverlay 300 may include the adhesive layer 330, the coverlay 300 may be adhered to the surface of the battery cells 100a, 100b, 100c, and 100d and the dummy cells 500.

Then, the electrode tabs 200a, 200b, 200c, 200d, and 200e may be bent to bring the electrode tabs 200a, 200b, 200c, 200d, and 200e into contact with the respective battery connecting pads 311a, 311b, 311c, 311d, and 311e of the coverlay 300. The electrode tabs 200a, 200b, 200c, 200d, and 200e may be bent at the bent portions 230a, 230b, 230c, 230d, and 230e, respectively, as described above with reference to FIGS. 4A through 5B.

Next, the electrode tabs 200a, 200b, 200c, 200d, and 200e may be attached to the battery connecting pads 311a, 311b, 311c, 311d, and 311e, respectively, by, e.g., welding. In an implementation, the welding may include, e.g., soldering or resistance welding.

The welding of the electrode tabs 200a, 200b, 200c, 200d, and 200e to the battery connecting pads 311a, 311b, 311c, 311d, and 311e may be sequentially performed from a negative electrode terminal to a positive electrode terminal of the battery pack 1000.

The battery pack 1000 may have the plurality of battery cells 100a, 100b, 100c, and 100d connected in series to each other. A negative electrode terminal 154a of a firstly connected one, i.e., the first battery cell 100a, among the plurality of battery cells 100a, 100b, 100c, and 100d may become a negative electrode terminal of the battery pack 1000. A positive electrode terminal 152d of a finally connected one, i.e., the fourth battery cell 100d, among the plurality of battery cells 100a, 100b, 100c, and 100d may become a positive electrode terminal of the battery pack 1000.

The previous reference to sequentially welding from a negative electrode terminal to a positive electrode terminal of the battery pack 1000 means that the first electrode tab 200a connected to the negative electrode terminal 154a of the first battery cell 100a may be welded to the battery connecting pad 311a. Then, a second electrode tab 200b, a third electrode tab 200c, and a fourth electrode tab 200d connected to negative electrode terminals 154b, 154c, and 154d of a second battery cell and battery cells following the second battery cell, i.e., the second battery cell 100b, the third battery cell 100c, and the fourth battery cell 100d, may be sequentially welded to the battery connecting pads 311b, 311c, and 311d. Next, a fifth electrode tab 200e connected to the positive electrode terminal 152d of the final battery cell, i.e., the fourth battery cell 100d, may be welded to the battery connecting pad 311e.

When the electrode tabs 200a, 200b, 200c, 200d, and 200e are welded to the battery connecting pads 311a, 311b, 311c, 311d, and 311e, respectively, solder may be melted from the solder layer 340 of the battery connecting pads 311a, 311b, 311c, 311d, and 311e, such that the molten solder flows into the solder receiving holes 240a, 240b, 240c, 240d, and 240e of the electrode tabs 200a, 200b, 200c, 200d, and 200e. When the welding is completed, followed by cooling, the molten solder may be solidified to then cover internal spaces and entrances of the solder receiving holes 240a, 240b, 240c, 240d, and 240e.

In other words, as illustrated in FIGS. 11 through 12B, when the second electrode tab 200b is welded to the battery connecting pad 311b, the solder layer 340 may be melted as the result of the welding. The molten solder from the solder layer 340 may cover the internal space and entrance of the solder receiving hole 240b. Thereafter, after the welding is completed and cooling is performed, the solidifying of the solder covering the internal space and entrance of, i.e., may fill, the solder receiving hole 240b may make the solder receiving hole 240b convexly protrude while covering the internal space and entrance thereof.

It will be seen that embodiments have been described in which a battery pack has a compact size with a plurality of battery cells stably mounted therein.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a plurality of battery cells connected in series or in parallel;
   a protective circuit module (PCM) for controlling charging and discharging of the plurality of battery cells;
   a coverlay electrically connecting the plurality of battery cells to the PCM, the coverlay including at least one through-hole and a plurality of wires, each of the plurality of wires including:
      a module connecting pad provided at an end thereof, the module connecting pad being connected to the PCM, and
      a battery connecting pad provided at another end thereof, the battery connecting pad being connected to one of the battery cells and including a solder layer thereon; and
   electrode tabs electrically connecting the battery connecting pads and respective positive and negative electrode terminals of the battery cells, at least one of the electrode tabs passing through the at least one through-hole and extending over a surface of the coverlay that is opposite to the battery cells.

2. The battery pack as claimed in claim 1, wherein the coverlay is a flexible printed circuit board (FPCB) including the wires.

3. The battery pack as claimed in claim 1, wherein the coverlay includes an adhesive layer on a surface thereof, the adhesive layer being for adhering the coverlay to the plurality of battery cells.

4. The battery pack as claimed in claim 1, wherein the coverlay:
   surrounds the plurality of wires to insulate the wires, and
   includes an insulating layer having a module connecting pad opening and a battery connecting pad opening, the module connecting pads being exposed through the module connecting pad opening and the battery connecting pads being exposed through the battery connecting pad opening.

5. The battery pack as claimed in claim 1, wherein each of the electrode tabs includes:
- a battery contact portion connected to the positive electrode terminal or the negative electrode terminal of at least one of the battery cells,
- a pad contact portion connected to one of the battery connecting pads, and
- a bent portion between the battery contact portion and the pad contact portion, the bent portion being configured to facilitate bending of the battery contact portion and the pad contact portion at a predetermined position.

6. The battery pack as claimed in claim 5, wherein each of the electrode tabs includes a solder receiving hole, the solder receiving hole accommodating solder from the solder layer when the pad contact portion and the battery connecting pad are welded to each other.

7. The battery pack as claimed in claim 6, wherein an internal space and an entrance of the solder receiving hole are covered by the solder.

8. The battery pack as claimed in claim 5, wherein the bent portion includes an area at which a width of the battery contact portion is different from a width of the pad contact portion.

9. The battery pack as claimed in claim 5, wherein the bent portion includes at least one notch on at least one lateral side or on at least one surface of the electrode tab.

10. The battery pack as claimed in claim 9, wherein the bent portion includes at least two notches on opposite lateral sides or opposite lateral surfaces of the electrode tab.

11. The battery pack as claimed in claim 1, wherein the plurality of battery cells includes a total number of battery cells and a number of the wires is one greater than the total number of the battery cells.

12. A method for manufacturing a battery pack, the method comprising:
- connecting a plurality of battery cells in series or in parallel using a plurality of electrode tabs;
- preparing a coverlay including a plurality of wires and through-holes;
- electrically connecting a protective circuit module (PCM) to the plurality of wires;
- mounting the coverlay on a surface of the plurality of battery cells such that at least one of the electrode tabs passes through one of the through-holes in the coverlay;
- bending the electrode tabs such that the electrode tabs extend over a surface of the coverlay that is opposite to the battery cells and contact a plurality of battery connecting pads at ends of the plurality of wires; and
- welding the electrode tabs to the respective battery connecting pads.

13. The method as claimed in claim 12, wherein:
- the electrode tabs include solder receiving holes,
- each of the battery connecting pads includes a solder layer, and
- during welding of the electrode tabs to the battery connecting pads, solder of the solder layer is melted such that the solder flows into the solder receiving holes.

14. The method as claimed in claim 12, wherein:
- the battery cells are connected in series to each other, and
- welding of the electrode tabs to the battery connecting pads includes sequentially welding from a negative electrode terminal to a positive electrode terminal of the battery pack.

15. The method as claimed in claim 14, wherein sequentially welding from the negative electrode terminal to the positive electrode terminal of the battery pack includes:
- welding the electrode tab connected to a negative electrode terminal of a first battery cell to a corresponding battery connecting pad,
- sequentially welding the electrode tabs connected to negative electrode terminals of a second battery cell and battery cells following the second battery cell to corresponding battery connecting pads, and
- welding the electrode tab connected to a positive electrode terminal of a final battery cell to a corresponding battery connecting pad.

16. The battery pack as claimed in claim 5, wherein, in each electrode tab, the bent portion has a width that is less than a width of the battery contact portion and a width of the pad contact portion.

17. The battery pack as claimed in claim 5, wherein, in each electrode tab, the battery contact portion and the pad contact portion extend from the bent portion along substantially perpendicular directions.

18. The method as claimed in claim 12, wherein:
each of the electrode tabs includes:
- a battery contact portion connected to the positive electrode terminal or the negative electrode terminal of at least one of the battery cells,
- a pad contact portion connected to one of the battery connecting pads, and
- a bending portion between the battery contact portion and the pad contact portion,
- the bending portion of each electrode tab has a width that is less than a width of the battery contact portion and a width of the pad contact portion, and
- bending the electrode tabs includes bending the electrode tabs at the bending portions.

19. The method as claimed in claim 18, wherein the electrode tabs are bent such that the battery contact portion and the pad contact portion in each electrode pad extend from the bending portion along substantially perpendicular directions.

20. The method as claimed in claim 12, wherein the electrode tabs are bent after being passed through the through-holes.

* * * * *